(12) United States Patent
Hanebuth et al.

(10) Patent No.: US 10,141,617 B2
(45) Date of Patent: Nov. 27, 2018

(54) GAS TURBINE-HEATED HIGH-TEMPERATURE BATTERY

(71) Applicant: Siemens Aktiengesellschaft, Munich (DE)

(72) Inventors: Marc Hanebuth, Nuremberg (DE); Sylvio Kosse, Erlangen (DE); Uwe Lenk, Zwickau (DE)

(73) Assignee: Siemens Aktiengesellschaft, Munich (DE)

( * ) Notice: Subject to any disclaimer, the term of this patent is extended or adjusted under 35 U.S.C. 154(b) by 776 days.

(21) Appl. No.: 14/380,712

(22) PCT Filed: Mar. 6, 2013

(86) PCT No.: PCT/EP2013/054497
§ 371 (c)(1),
(2) Date: Aug. 23, 2014

(87) PCT Pub. No.: WO2013/131953
PCT Pub. Date: Sep. 12, 2013

(65) Prior Publication Data
US 2015/0020531 A1    Jan. 22, 2015

(30) Foreign Application Priority Data

Mar. 8, 2012    (DE) .................. 10 2012 203 665

(51) Int. Cl.
*F02C 6/14*    (2006.01)
*H01M 10/66*    (2014.01)
(Continued)

(52) U.S. Cl.
CPC .......... *H01M 10/5093* (2013.01); *F02C 3/04* (2013.01); *F02C 6/14* (2013.01); *F02C 6/18* (2013.01);
(Continued)

(58) Field of Classification Search
CPC ......... F02C 6/14; F02C 6/18; H01M 8/04014; H01M 8/04022; H01M 8/18;
(Continued)

(56) References Cited

U.S. PATENT DOCUMENTS 5,449,568 A * 9/1995 Micheli .................... F02C 1/05
429/434
6,365,290 B1 * 4/2002 Ghezel-Ayagh ............................
H01M 8/04089
429/423
(Continued)

FOREIGN PATENT DOCUMENTS

CA    2427419 A1    5/2002
CN    1503996 A    6/2004
(Continued)

OTHER PUBLICATIONS

JP Notice of Allowance dated Aug. 23, 2016, for JP application No. 2014-560353.

*Primary Examiner* — Arun Goyal
(74) *Attorney, Agent, or Firm* — Beusse Wolter Sanks & Maire

(57) ABSTRACT

A power plant system is provided having a high temperature battery, supplied with fluid via at least one supply line, for storing and releasing electrical energy, a gas turbine for generating electrical energy, and a heat exchanger which is designed to extract thermal energy from the exhaust stream of the gas turbine and transfer said thermal energy to the fluid, which fluid can be supplied after heat transfer to the high temperature battery via the at least one supply line.

14 Claims, 2 Drawing Sheets

(51) Int. Cl.
*H01M 12/08* (2006.01)
*H01M 8/04014* (2016.01)
*F02C 6/18* (2006.01)
*F02C 3/04* (2006.01)
*H01M 10/615* (2014.01)
*H01M 10/627* (2014.01)
*H01M 8/18* (2006.01)
*H01M 10/39* (2006.01)

(52) U.S. Cl.
CPC ..... *H01M 8/04014* (2013.01); *H01M 10/615* (2015.04); *H01M 10/627* (2015.04); *H01M 10/66* (2015.04); *H01M 12/08* (2013.01); *H01M 8/04022* (2013.01); *H01M 8/18* (2013.01); *H01M 10/3909* (2013.01); *H01M 2220/10* (2013.01); *H01M 2250/40* (2013.01); *H01M 2300/0077* (2013.01); *Y02E 20/16* (2013.01); *Y02E 60/128* (2013.01); *Y02E 60/56* (2013.01)

(58) Field of Classification Search
CPC ........... H01M 10/3909; H01M 10/615; H01M 10/627; H01M 10/633; H01M 10/66
See application file for complete search history.

(56) References Cited

U.S. PATENT DOCUMENTS

| | | | |
|---|---|---|---|
| 7,862,938 B2 * | 1/2011 | Ghezel-Ayagh | F02C 1/007 |
| | | | 429/425 |
| 8,795,907 B2 * | 8/2014 | Becker | H01M 8/04014 |
| | | | 429/408 |
| 9,435,230 B2 * | 9/2016 | Kim | H01M 8/04014 |
| 2002/0163819 A1 * | 11/2002 | Treece | F02B 43/10 |
| | | | 363/34 |
| 2004/0020206 A1 * | 2/2004 | Sullivan | F01C 1/0215 |
| | | | 60/670 |
| 2008/0292945 A1 | 11/2008 | Butine | |
| 2010/0119892 A1 | 5/2010 | Lundberg | |
| 2011/0195321 A1 | 8/2011 | Takahashi et al. | |
| 2013/0034784 A1 | 2/2013 | Landes | |

FOREIGN PATENT DOCUMENTS

| | | |
|---|---|---|
| DE | 102009057720 A1 | 6/2011 |
| JP | H06176792 A | 6/1994 |
| JP | 2001229961 A | 8/2001 |
| JP | 200455373 A | 2/2004 |
| JP | 2004055373 A | 2/2004 |
| JP | 2004538600 A | 12/2004 |
| JP | 2009187755 | 8/2009 |
| JP | 2009187755 A | 8/2009 |
| JP | 2011165353 A | 8/2011 |
| WO | 0237587 A2 | 5/2002 |

* cited by examiner

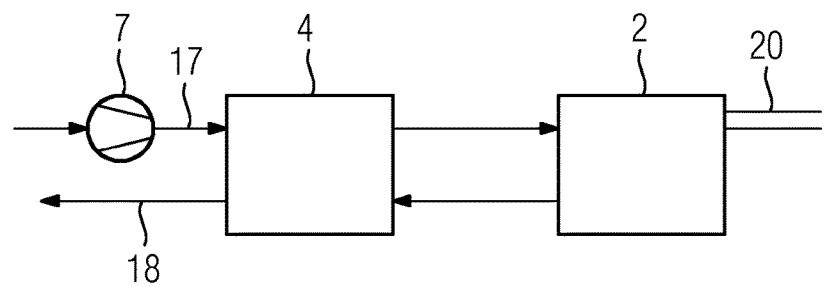
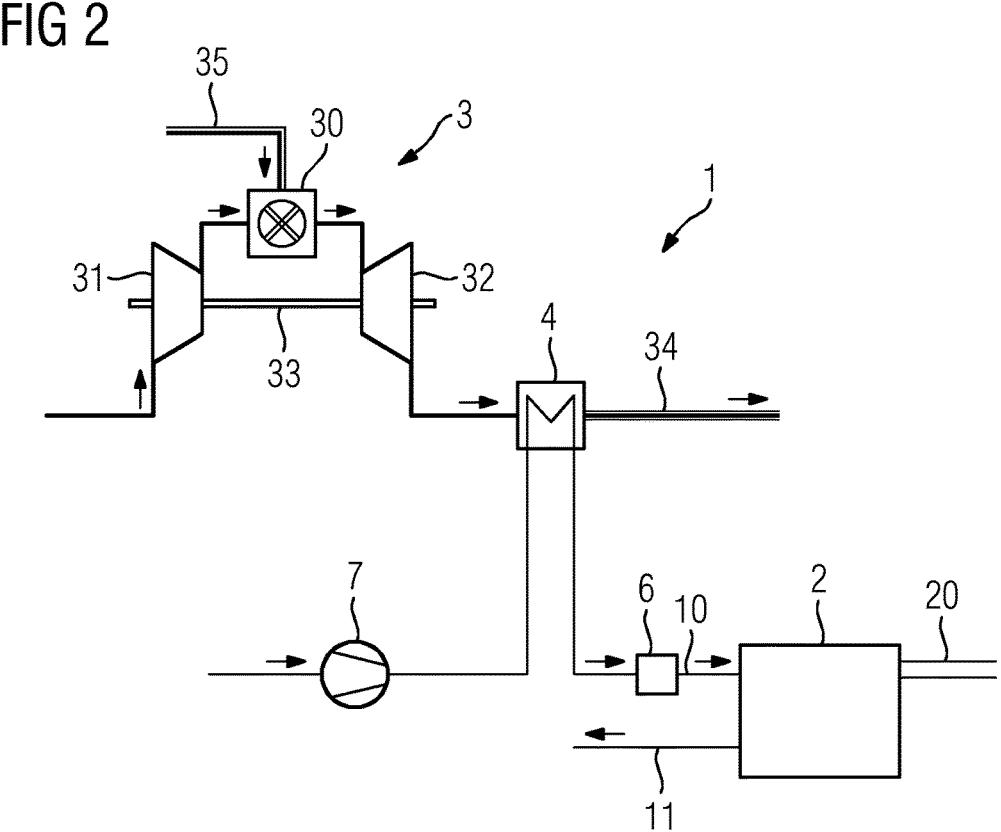

GAS TURBINE-HEATED HIGH-TEMPERATURE BATTERY

CROSS REFERENCE TO RELATED APPLICATIONS

This application is the US National Stage of International Application No. PCT/EP2013/054497 filed Mar. 6, 2013, and claims the benefit thereof. The International Application claims the benefit of German Application No. DE 102012203665.2 filed Mar. 8, 2012. All of the applications are incorporated by reference herein in their entirety.

FIELD OF INVENTION

The present invention relates to a power plant system, comprising a gas turbine, which is designed for the thermal supply of a high-temperature battery. The present invention also relates to a method for operating such a power plant system.

BACKGROUND OF INVENTION

In the course of converting the public power supply towards a supply which is increasingly oriented towards regenerative power supply, it proves to be increasingly important to react to short-term fluctuations in the electric supply network by provision of electric control reserves. Particularly when the public power demand rises above a base load for a short time, it is necessary the cover this additional energy demand by means of suitable medium-load or peak-load power plants.

Particularly the power supply when encountering short-term peak loads constitutes a huge challenge to the public power supply, however. For covering these short-term demand peaks, quickly controllable peak-load power plants are typically used. These can provide high electric outputs to the public electricity network within seconds or minutes and so cover the demand. Also, during network controlling, during which fluctuations in the case of changing power output demands in the public electricity network have to be compensated, power plant types which allow a high time dynamic with regard to their possible power output are required.

Pump-storage power plants or compressed air storage power plants inter alia are counted among conventional peak-load power plants. However, gas turbine power plants are also suitable for network control on account of their comparatively short startup times which lie within the range of a few minutes. Despite this flexibility with regard to the provision of electric energy, it is shown to be essential, however, to provide additional power supply devices which can cover a very short-term power demand. In this case, especially high-temperature batteries can play a large role and can provide power outputs to the public electricity network within the region of seconds. Moreover, such high-temperature batteries allow the electric temporary storage of surplus power from the public electricity network at times of over-production which in turn can be made available to the electricity network at times of increased power demand.

A battery type, the operating temperature of which lies above 100° C., preferably above 250° C., more preferably above 500° C. and most especially preferably above 600° C., is to be understood as a high-temperature battery in this case and in the following text. In particular, mention is to be made in this case of the sodium-sulfur accumulator which can be operated as a solid-electrolyte accumulator at operating temperatures of typically above 250° C. The typical operating temperatures of a sodium-sulfur accumulator lie between 250° C. and 350° C.

Most especially preferably, the high-temperature battery is also designed as a metal-air battery, as is described in detail in the laid-open publication DE 10 2009 057 720 A1, for example. This publication shall also be explicitly incorporated herewith by reference in the present case. The metal-air battery which is described therein is based on the use of a metal as a reducible chemical accumulator in combination with a process gas electrode which is typically supplied with oxygen, especially air oxygen, during operation. For the electrical separation of the process gas electrode, acting as a cathode during the discharging operation, from a metal-containing anode, provision is made for a solid electrolyte which conducts oxygen ions. Such a solid electrolyte can be yttrium-stabilized zirconium dioxide, for example. The solid electrolyte, on account of its selective ion conductivity, allows the transporting of oxygen ions from the cathode to the anode. At the same time, the solid electrolyte has electrical insulation properties which ensure that electrical charge carriers can flow from the anode to the cathode only via an external conductor. In order to be able to ensure a sufficient ion conductivity, it is necessary, however, to achieve an operating temperature of approximately 600° C. Typical operating temperatures lie between 600° C. and 800° C.

A disadvantage during operation of the above-described high-temperature batteries are their supply with sufficient thermal energy for achieving the necessary operating temperatures. In particular, the previously described metal-air battery, on account of its operating temperatures of typically at least 600° C., requires the provision of a large quantity of thermal power. This is typically provided via suitable electric heating elements, which in their turn are again operated by power from the public electricity networks. As a result of the additional demand for electric power, the overall efficiency of the high-temperature batteries is noticeably reduced, however. Since the high-temperature batteries, however, are to deliver electric power especially at times at which an increased power demand and a low power supply exist anyway, and consequently the electric power from the public electricity networks is comparatively expensive, an uneconomical operation results particularly at these operating times.

SUMMARY OF INVENTION

Consequently, it proves to be a technical object in the present case to avoid this reduction of the overall efficiency and to propose an arrangement which allows an efficiency improvement during operation of the high-temperature batteries. In particular, a method for operating such a high-temperature battery, which enables an efficient operation of the high-temperature battery, is also to be proposed. Furthermore, an advantageous supply of a high-temperature battery with energy for providing the necessary thermal operating temperatures, which, moreover, can be realized inexpensively and technically without significant cost, is to be achieved.

This object of the invention is achieved by means of a power plant system and a method for operating such a power plant system according to the claims.

In particular, an object of the invention is achieved by means of a power plant system which comprises a high-temperature battery, supplied with a fluid via at least one feed line, for storing and also for delivering electric energy, and also by means of a gas turbine for generating electric energy, and also by means of a heat exchanger which is designed for extracting thermal energy from the exhaust gas flow of the gas turbine and for transferring said thermal energy to the fluid, which fluid, after heat transfer has been carried out, can be fed to the high-temperature battery via the at least one feed line.

In particular, an object of the invention is also achieved by means of the method for operating such a power plant system, wherein the feed of fluid, which is thermally conditioned in the heat exchanger, is especially carried out via the feed line to the high-temperature battery in a temperature-controlled and/or flow-controlled manner.

According to aspects of the invention, the efficiency improvement during operation of the high-temperature battery is therefore achieved by means of an integration solution. In this case, the high-temperature battery is integrated into a power plant system which during control operation is designed for generating electric energy by means of a gas turbine. The exhaust gas flow of the gas turbine, which has a high thermal energy content, is especially suitable in this case for providing the thermal energy which is required for operating the high-temperature battery since the thermal energy of the exhaust gas flow constitutes inexpensive waste heat and has a sufficient temperature level.

In order to extract the thermal energy from the exhaust gas flow of the gas turbine, provision is made according to the invention for a heat exchanger, by means of which thermal energy is transferred from the exhaust gas flow to a fluid which, after heat transfer has been carried, is fed to the high-temperature battery. During a typical load operation of the gas turbine, the temperature level of the exhaust gas flow lies typically at less than 600° C., but at more than 550° C. On account of the high quantity of heat which is available in this case, the fluid which is provided for supplying to the high-temperature battery can also be heated to a comparable temperature level. Consequently, not only the operation of sodium-sulfur accumulators, which require an operating temperature of above 250° C., is possible but in particular and preferably also the operation of a metal-air battery, described further above, which has an operating temperature of at least 500° C., typically between 600° C. and 800° C. Thus, it is necessary in the case of the described metal-air battery, for example, to continuously feed air oxygen to the cathodic process gas electrode, which oxygen is consumed in part during the discharging operation. If during a conventional operation the supplied air is electrically preheated by means of external heat sources, according to the invention a thermal transfer of the heat from the exhaust gas flow of the gas turbine is possible. The thermal energy does not advantageously have to be generated with additional generation cost, however, but can be inexpensively extracted from the waste heat of the exhaust gas flow of the gas turbine. Since the described metal-air battery has to be supplied at times by means of comparatively large air flows, this consequently signifies a great energetic advantage and a noticeable improvement of the overall efficiency of the power plant system and also of the high-temperature battery supplied with heat. The higher the temperature level at which the high-temperature battery has to be maintained during operation is, the more economical this balance turns out to be.

Particularly if the operation of the power plant system or the feed of fluid to the high-temperature battery is carried out by means of an advantageous temperature control and/or flow control, the high-temperature battery can be supplied with suitable quantities of heat so that an efficient operation is made possible. At the same time, on account of the temperature control and/or flow control the effect of economical quantities of thermal energy being extracted from the exhaust gas flow of the gas turbine can be achieved. Consequently, the overall efficiency of the power plant system according to the invention can be increased in a suitable way.

In a first embodiment of the power plant system according to aspects of the invention, the high-temperature battery has a discharge line which is designed for discharging the fluid from the high-temperature battery and feeding said fluid to the environment. According to the embodiment, the residual thermal energy, which still remains in the fluid after interaction with the high-temperature battery, is therefore discarded and fed to the environment. This proves to be especially advantageous since further constructional provisions are no longer to be made for the discharging of the thermal energy. Feeding into the environment proves to be especially cost-effective and of low labor intensity. This is especially the case if the fluid which is fed to the environment is air which can be distributed in the environment without risk to the surroundings.

This situation is different in the case of an also preferred embodiment of the present invention, according to which the high-temperature battery has a discharge line which is designed for discharging the fluid from the high-temperature battery and feeding said fluid to the exhaust gas of the gas turbine, especially at a downstream point of the exhaust gas flow with regard to the heat exchanger. According to the embodiment, the thermal energy which is no longer required by the high-temperature battery is therefore made available again to the exhaust gas flow of the gas turbine in order to be able, for example, to subsequently supply additional devices with thermal energy as a result. Such an embodiment proves to be suitable especially in the case of a coupled gas and steam power plant, in which the steam generation for operating a steam turbine is supplied with thermal energy from the exhaust gas flow of the gas turbine.

Depending on the operating state of the high-temperature battery, this may also require a smaller or larger quantity of thermal energy for the particular operation. Consequently, smaller or larger quantities of thermal energy can also be made available again after recirculation into the exhaust gas flow of the gas turbine. Moreover, it is also possible that the high-temperature battery provides additional thermal energy when in operation. This, for example, is the case in the above-described metal-air battery which when discharging can transfer additional thermal energy to the fluid on account of an exothermic reaction of the metal with steam, forming a metal oxide. This can be advantageously utilized on the downstream side after suitable recirculation to the exhaust gas flow of the gas turbine. A recirculation of the fluid into the exhaust gas flow of the gas turbine can consequently again increase the overall efficiency of the power plant system. If the recirculation is carried out especially at a downstream point of the exhaust gas flow with regard to the heat exchanger, then the heat exchanger can be operated under generally constant temperature conditions.

The situation is again different in the case of a further, also highly preferred embodiment of the power plant system which is distinguished by the high-temperature battery having a discharge line which is designed for discharging the fluid from the high-temperature battery and feeding said fluid to the heat exchanger. In this case, the feeding is carried out at an upstream point of the exhaust gas flow with regard to the heat exchanger. As a result, the thermal energy of the fluid which is no longer required by the high-temperature battery can be made available again to the heat exchanger. This recirculation proves to be especially advantageous particularly when the fluid which is discharged from the high-temperature battery has a higher heat content than the fluid originally supplied to the high-temperature battery. In this case, to be specific, the relatively hotter fluid flows over the heat exchanger and at the same time, or subsequently, mixes with the exhaust gas flow of the gas turbine. During this mixing process, the temperature of the fluid is reduced. The temperature level of the exhaust gas flow is increased in this event. The feeding to the heat exchanger can be conducted so that this, at least partially, initially thermally interacts with the recirculated fluid, and only subsequently absorbs thermal energy from the exhaust gas flow of the gas turbine. In this case, a temporal as well as a locational separation can be undertaken.

According to a further embodiment of the power plant system, it is provided that the temperature of the exhaust gas flow of the gas turbine has at least a temperature of 600° C. The typical load operation of a gas turbine results in a temperature level of less than 600° C. in the exhaust gas flow of the gas turbine. However, it is possible to raise the temperature level of the exhaust gas flow to at least 600° C. by suitable selection of the operating parameters of the gas turbine, wherein the reduction of the mechanical power of the gas turbine is typically associated therewith. Such a reduction, however, can again be compensated by a suitable power increase of a downstream steam turbine. If at the same time sufficient heat is transferred via the heat exchanger to the fluid, which is subsequently fed to the high-temperature battery, an additional temperature increase, for example by means of an additional heating device, for achieving the operating temperature of the high-temperature battery can be dispensed with. This especially relates to the metal-air battery described further above, which can be operated with air as process gas. According to the embodiment, the air can therefore already be heated to a sufficient temperature level before being fed into the high-temperature battery so that an economical operation of the high-temperature battery is made possible. If in this case the provision of additional thermal energy, for example by means of an electrically operated heating device, is at the same time superfluous, this again increases the overall efficiency of the power plant system.

According to a further embodiment of the power plant system according to aspects of the invention, this also has a turbine which is operated with steam, wherein its thermal energy is extracted at least partially from the exhaust gas flow of the gas turbine. In the case of such a suitable coupling of steam turbine and gas turbine, an improved level of overall efficiency of the power plant system can be achieved. With simultaneous thermal interposition of a high-temperature battery, a power plant system of especially advantageous efficiency can be made available.

According to a further embodiment of the power plant system according to aspects of the invention, the power plant system has an electric heating element which is designed for increasing the energy content of the fluid before it is fed to the high-temperature battery via the feed line, the electric heating element especially being arranged with regard to the feed line so that both thermally interact with each other. The heating element therefore allows the fluid to be supplied with additional thermal energy when required before it is fed to the high-temperature battery. Such a supply is particularly necessary if the fluid does not have the required operating temperature of the high-temperature battery. The electric heating element can in this case provide the amount of thermal difference and consequently ensures an economical operation of the high-temperature battery.

According to a further embodiment of the power plant system, the fluid can be subjected to a flow which is generated by a flow generator which is in fluidic functional communication with the feed line. The flow generator consequently allows the supply of the high-temperature battery with sufficient fluid which, for example, is required in order to avoid undesirable temperature gradients inside the high-temperature battery. Since high-temperature batteries have numerous components, especially ceramic components, which in the event of undesirable temperature differences can create high thermal stresses, a sufficiently large fluid flow rate through the high-temperature battery ensures a reduction or the avoidance of such thermal stresses since a larger input of heat can be carried out with simultaneously faster distribution.

According to a continuation of this embodiment, it can be provided that the fluid is a gas, especially air, wherein the flow generator is preferably designed as a fan. The fan supplies the high-temperature battery with sufficient quantities of thermally conditioned air, as a result of which an advantageous operation of the high-temperature battery can be achieved. Particularly during the operation of a metal-air battery, as described above, sufficient quantities of air can be fed as process gas to the metal-air battery by means of the fan. The quantities of air in this case are suitable in order to avoid thermal stresses in the metal-air battery to the extent that no fractures and therefore destruction can occur on the individual components.

According to a further embodiment of the power plant system according to aspects of the invention, the fluid is a gas, especially air, and the high-temperature battery is a metal-air battery which preferably requires thermally conditioned air as process gas. It is especially preferred if the thermal conditioning of the air ensures a temperature level of at least 600° C. According to the embodiment, the oxygen of the air is reduced in a discharging state of the metal-air battery and occurs after suitable ion migration through the solid electrolytes. The ionic oxygen is then reduced as a result of simultaneous release of electronic charge carriers through elementary hydrogen. Since the air already has a sufficient temperature level, it is in the position to heat the solid electrolytes to an operating temperature at which an advantageous conduction of ions is enabled. The thermal energy which is inherent to the air can consequently be transferred to the solid electrolytes or to the cathode by direct heat transfer. This constitutes a particularly efficient heat transfer inside such a metal-air battery.

Further embodiments are to be gathered from the dependent claims.

The invention shall be explained in more detail below with reference to the individual figures in which concrete embodiments are represented. In this case, the substantiation of the inventions in the individual figures is not to constitute any limitation with regard to the generality of the invention. In particular, reference is to be made to the fact that the figures are purely schematic representations, which primarily provides an easier comprehensibility.

BRIEF DESCRIPTION OF THE DRAWINGS

In the drawing in this case:

FIG. 1 shows a schematic connection arrangement for supplying a high-temperature battery by means of an external heat source;

FIG. 2 shows a first embodiment of the invention in a schematic view of connections;

DETAILED DESCRIPTION OF INVENTION

Figure 3:
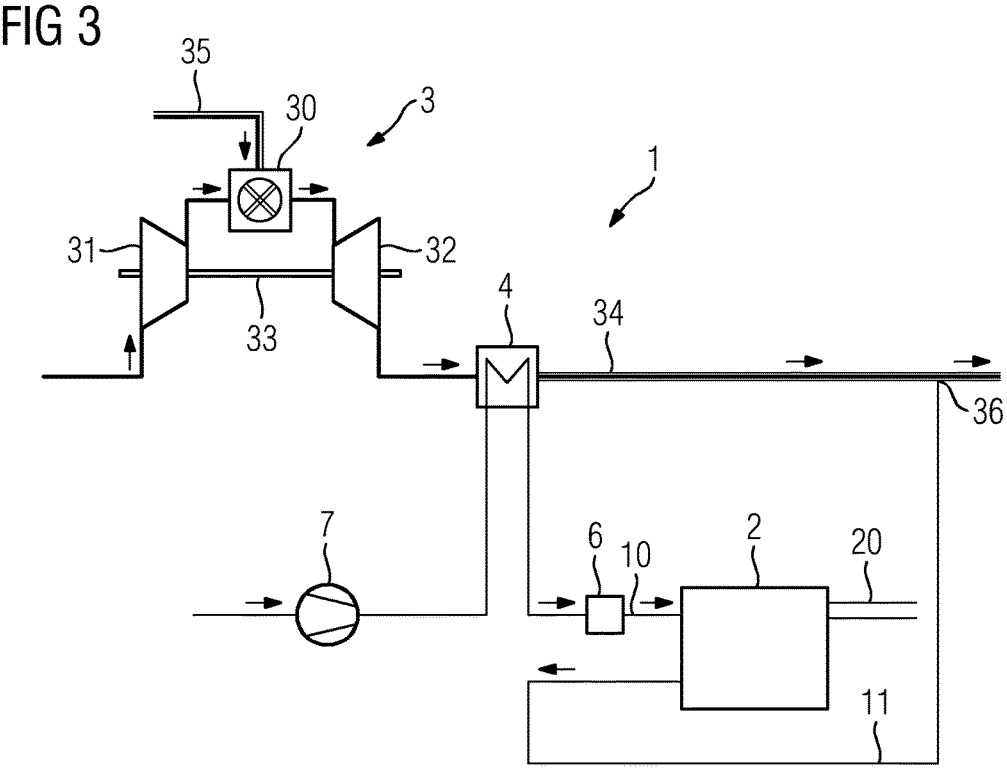
FIG. 3 shows a second embodiment of the invention in a schematic view of connections.

FIG. 1 shows a schematic view of a connection arrangement for discharging the thermal power produced in a high-temperature battery 2 by means of a heat exchanger 4. This, for example, is the case during operation of the metal-air battery which is described above. In this case, in an operating state in which the high-temperature battery 2 is in a position to provide thermal power, this is transferred to a heat exchanger 4 which can transfer the thermal power at least partially to a fluid which is fed through the inlet line 17. After heat transfer, the relatively hotter fluid is discharged through the discharge line 18. The feeding of the fluid via the inlet line 17 can be supported by means of a flow generator 7.

According to the embodiment shown in FIG. 1, it is only possible, however, to discharge the thermal energy which is produced during operation of the high-temperature battery 2. The connection arrangement, however, is capable of not enabling the supply of the high-temperature battery 2 with thermal energy for achieving a suitable operating temperature. However, only upon achieving a minimum thermal temperature can the high-temperature battery 2 be operated economically and be capable of providing electric energy via the electrical discharge line 20.

In order to achieve the operating temperature of the high-temperature battery 2, provision is therefore made for typically suitable heating devices by means of which the high-temperature battery 2 can be brought up to the operating temperature. The heating devices, which are not additionally shown in FIG. 1, are supplied with electric energy and consequently necessitate an additional supply- and cost outlay.

So as not to only discharge the thermal energy which is possibly produced during operation of a high-temperature battery 2 but also to heat the high-temperature battery 2 in the first place to an operating temperature, the first embodiment of the invention represented in FIG. 2 is suitable. Consequently, the power plant system 1 according to the embodiment comprises a gas turbine 3 which fires a gaseous fuel from the fuel feed line 35 for operation in the combustion chamber 30. The operation of the gas turbine 3 leads to a compression of air in the compression stage 31 and also to a decompression, mechanically driving the turbine blades, connected to the shaft 33, of the turbine stage 32. At this point, it may also be noted that the compression stage 31 can have a multiplicity of individual compression stages or the turbine stage 32 can have a multiplicity of individual turbine stages. The exhaust gas flow 34 which is produced as a result of the combustion process is suitably routed, wherein at least some the heat contained in the exhaust gas flow 34 can be at least partially discharged through a heat exchanger 4.

The transfer of heat from the exhaust gas flow 34 is carried out to a fluid, not additionally shown, which for further thermal conditioning is fed in a feed line 10 to a heating element 6. After the possible conditioning in the heating element 6, the fluid is fed via the feed line 10 to the high-temperature battery 2. On account of the increased temperature level or on account of the thermal energy contained in the fluid, by thermal interaction in the high-temperature battery 2 thermal energy is transferred to the high-temperature battery 2 which is at a lower temperature level. This transfer of heat ensures an operating temperature of the high-temperature battery 2 is achieved so that this can provide electric energy in an economical measure via the electric discharge line 20 or can absorb the electric energy for storage. In order to be able to provide a sufficiently large fluid flow from the feed line 10 to the high-temperature battery 2, provision is made for a flow generator 7 which subjects the fluid to a flow. For discharging the residual thermal energy from the high-temperature battery 2 or for discharging the fluid, the high-temperature battery 2 has a discharge line 11 which opens into the environment. Consequently, the fluid or the thermal energy contained therein is fed to the environment without additional utilization.

According to the embodiment of the present invention shown in FIG. 3, however, the heat which is discharged from the high-temperature battery 2 can be put to use again. In this case, the embodiment shown in FIG. 3 differs from the embodiment shown in FIG. 2 only to the effect that the discharge line 11 does not open into the environment but is directed to the exhaust gas flow 34 again. This is carried out according to the embodiment at a feed point 36 which is arranged in the exhaust gas flow on the downstream side with regard to the heat exchanger 4. Consequently, the thermal energy which is no longer required by the high-temperature battery 2 can be made available again to the exhaust gas flow in order to thereby operate additional devices, for example. Especially preferably, a steam generating unit, which is provided for the provision of steam for the operation of a steam turbine, can therefore be operated in this way.

Such a feed of the fluid into the exhaust gas flow, which is discharged from the high-temperature battery 2, is then particularly suitable for increasing the overall efficiency of the power plant system 1 when the high-temperature battery 2 generates thermal energy itself during operation. This is particularly the case if the high-temperature battery 2 is a metal-air battery, as described above. In such a case, the additional thermal energy which is extracted from the high-temperature battery 2 can be fed to the exhaust gas flow 34 and therefore increases its temperature level. This in turn allows an improved generation of steam in a possibly downstream steam generating unit. It is also conceivable that the feed into the exhaust gas flow 34 is only carried out when the high-temperature battery 2 itself generates thermal energy. If, however, the high-temperature battery 2 in another operating state, for example in a load state, should only consume thermal energy and not make additional provision thereof, the discharge line 11 can even be disconnected. In such another operating state, the fluid issuing from the high-temperature battery 2 could, for example, be fed to another device. Discharging into the environment is also technically possible.

Figure 4:
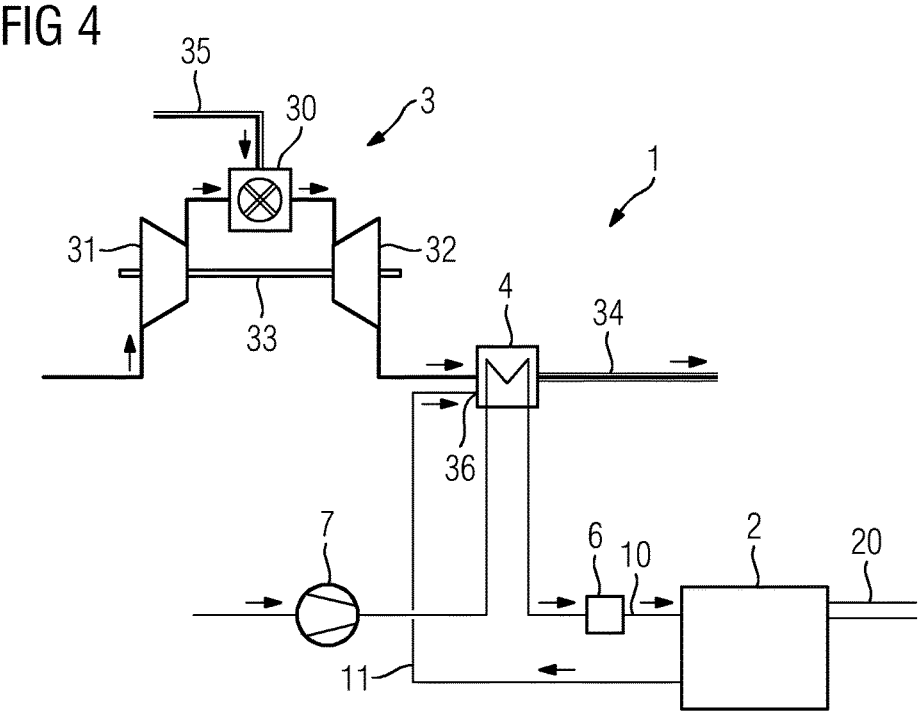
FIG. 4 shows a schematic view according to a third embodiment of the invention in a view of connections.

According to an embodiment, as shown in FIG. 4, the fluid which is discharged from the high-temperature battery 2 can be made available to the heat exchanger 4. To this end, the fluid is directed by means of the discharge line 11 to a suitable feed point 36 of the heat exchanger 4. This constitutes an advantageous conducting and utilization of the fluid especially when during operation of the high-temperature battery 2 additional thermal energy is produced and the fluid has a higher temperature level than when feeding into the high-temperature battery 2. Consequently, the thermal energy being released during operation of the high-temperature battery 2 is transferred again to the fluid in the heat exchanger 4, which fluid is fed as process gas via the feed line 10 for operation of the high-temperature battery 2. The feed to the heat exchanger 4 can be designed so that mixing with the exhaust gas flow 34 is carried out before heat transfer in the heat exchanger 4 or only during or after the heat transfer. In any case, it is to be ensured, however, that a thermal heat transfer can be carried out at another temperature level, preferably at an increased temperature level, in comparison to the pure exhaust gas flow 34. Particularly in the case of the operation of a metal-air battery described above, the fluid is air and can be fed to the exhaust gas flow 34 even at an increased temperature level.

The invention claimed is:

1. A power plant system comprising:
a high-temperature battery, supplied with a fluid via at least one feed line, for storing and also for delivering electric energy,
a gas turbine, comprising at least one compression stage for compressing air, a combustion chamber configured to receive the air and generate combustion gases, and at least one turbine stage configured to receive the combustion gases and to generate an exhaust gas flow, for generating electric energy, and
a heat exchanger adapted for extracting thermal energy from the exhaust gas flow of the at least one turbine stage and transferring said thermal energy to the fluid, which fluid is fed to the high-temperature battery via the at least one feed line after heat transfer has been carried out,
wherein the high-temperature battery comprises a discharge line adapted for discharging the fluid from the high-temperature battery and for feeding said fluid to the exhaust gas flow of the gas turbine at a point in the exhaust gas flow downstream of the heat exchanger to form a combined exhaust flow,
wherein in the heat exchanger the fluid and the exhaust gas flow are not in direct fluid communication with each other, and
wherein the power plant system further comprises a steam turbine which is operated with steam, and wherein a thermal energy of the steam is extracted at least partially from the combined exhaust gas flow.

2. The power plant system as claimed in claim 1, wherein a temperature of the exhaust gas flow is at least 600° C.

3. The power plant system as claimed in claim 1, wherein the power plant system has an electric heating element adapted for increasing an energy content of the fluid in the at least one feed line via a thermal interaction therebetween before the fluid is fed to the high-temperature battery via the at least one feed line.

4. The power plant system as claimed in claim 1, wherein the fluid is subjected to a flow which is generated by a flow generator which is in fluidic functional communication with the at least one feed line.

5. The power plant system as claimed in claim 4, wherein the fluid is a gas.

6. The power plant system as claimed in claim 5, wherein the gas is air.

7. The power plant system as claimed in claim 5, wherein the flow generator is designed as a fan.

8. The power plant system as claimed in claim 1, wherein the fluid is a gas, and the high-temperature battery is a metal-air battery which requires thermally conditioned gas as process gas.

9. The power plant system as claimed in claim 8, wherein the gas is air.

10. The power plant system as claimed in claim 1, wherein the exhaust gas flow does not enter the high-temperature battery.

11. A method for operating a power plant system, the power plant system comprising:
a high-temperature battery, supplied with a fluid via at least one feed line, for storing and also for delivering electric energy,
a gas turbine, comprising at least one compression stage for compressing air, a combustion chamber configured to receive the air and generate combustion gases, and at least one turbine stage configured to receive the combustion gases and to generate an exhaust gas flow for generating electric energy, and
a heat exchanger adapted for extracting thermal energy from the exhaust gas flow of the at least one turbine stage and transferring said thermal energy to the fluid, which fluid is fed to the high-temperature battery via the at least one feed line after heat transfer has been carried out,
wherein the high-temperature battery comprises a discharge line adapted for discharging the fluid from the high-temperature battery and for feeding said fluid to the exhaust gas flow of the gas turbine at a point in the exhaust gas flow downstream of the heat exchanger to form a combined exhaust flow,
wherein in the heat exchanger the fluid and the exhaust gas flow do not share a flow path,
the method comprising feeding of fluid, which is thermally conditioned in the heat exchanger, via the at least one feed line to the high-temperature battery in a temperature-controlled and/or flow-controlled manner,
wherein the power plant system further comprises a steam turbine which is operated with steam and wherein a thermal energy of the steam is extracted at least partially from the combined exhaust gas flow.

12. The power plant system as claimed in claim 11, wherein the exhaust gas flow does not enter the high-temperature battery.

13. A power plant system comprising:
a gas turbine comprising a compression stage, a combustion chamber, a turbine stage, a heat exchanger, and a steam turbine,
a first circuit in which a working fluid flows first from the compression stage, then to the combustion chamber, then to the turbine stage, then to the heat exchanger, and then to a point downstream of the heat exchanger,
wherein the heat exchanger is configured to transfer thermal energy from the working fluid to a second fluid,
a high-temperature battery,
a feed line configured to configured to provide fluid communication between the heat exchanger and the high-temperature battery,
a discharge line configured to provide fluid communication between the high-temperature battery and the point in the first circuit downstream of the heat exchanger, and
a second circuit in which a second fluid flows: first through the heat exchanger where the second fluid is heated therein by a transfer of thermal energy from the working fluid to the second fluid; then to the high-temperature battery through the feed line; then through the high-temperature battery; and then to the point in the first circuit downstream of the heat exchanger through the discharge line,
wherein in the heat exchanger the first circuit and the second circuit are fluidically discrete from each other so that the working fluid and the second fluid are not in direct fluid communication with each other, wherein the first circuit and the second circuit merge at the point in the first circuit downstream of the heat exchanger, thereby forming a combined exhaust gas flow, wherein the steam turbine is operated with steam, and wherein a thermal energy of the steam is extracted at least partially from the combined exhaust gas flow, and wherein the high-temperature battery and the gas turbine produce electricity.

14. The power plant system as claimed in claim 13, wherein the working fluid does not enter the high-temperature battery.

* * * * *